Nov. 1, 1955  L. G. TAYLOR  2,722,111
APPARATUS TO PROMOTE CONTROLLED FREEZING
Filed March 3, 1953  4 Sheets-Sheet 1

INVENTOR.
LLOYD G. TAYLOR
BY

Nov. 1, 1955 L. G. TAYLOR 2,722,111
APPARATUS TO PROMOTE CONTROLLED FREEZING
Filed March 3, 1953 4 Sheets-Sheet 2
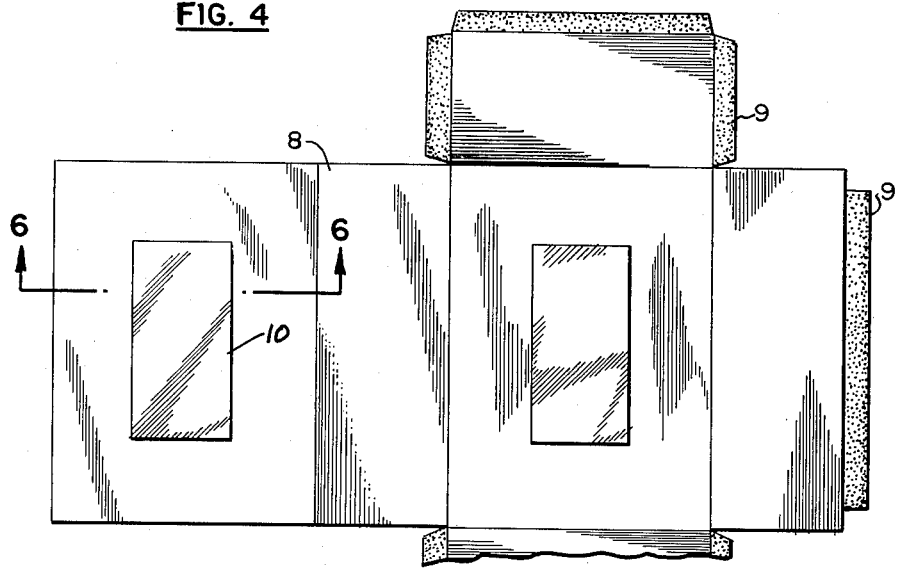
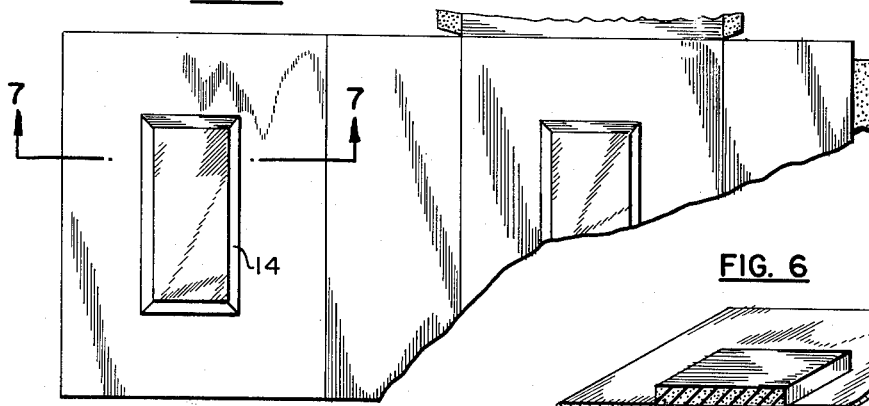
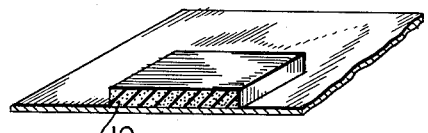
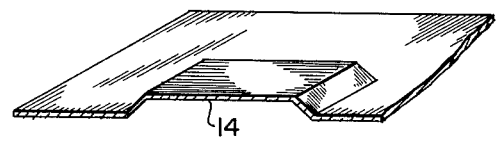
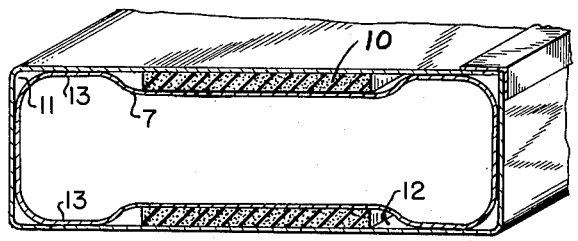
INVENTOR.
LLOYD G. TAYLOR Nov. 1, 1955  L. G. TAYLOR  2,722,111
APPARATUS TO PROMOTE CONTROLLED FREEZING
Filed March 3, 1953  4 Sheets-Sheet 3

INVENTOR.
LLOYD G. TAYLOR
BY

Nov. 1, 1955 — L. G. TAYLOR — 2,722,111
APPARATUS TO PROMOTE CONTROLLED FREEZING
Filed March 3, 1953 — 4 Sheets-Sheet 4

INVENTOR.
LLOYD G. TAYLOR
BY
Thomas W. J. Clark

United States Patent Office 2,722,111
Patented Nov. 1, 1955

2,722,111

APPARATUS TO PROMOTE CONTROLLED FREEZING

Lloyd G. Taylor, Ellicott City, Md.

Application March 3, 1953, Serial No. 340,044

5 Claims. (Cl. 62—114)

This invention relates to apparatus to promote the controlled freezing of food products and other fluid materials.

The invention is preferably carried out with a special container in conjunction with a water-tight and an air-tight bag, although it will be apparent that certain modifications of the containers illustrated do not require this bag. In the freezing of food products as that process is carried out at this time it has been customary to use a cardboard or fiber carton and to place in that carton a bag and to partially fill the bag either with juices or fluid foods or both up to approximately an inch of the top of the carton and then to seal the bag, leaving a considerable air space in it, close the carton and place the carton in a quick freeze unit. Then these packed products are removed from the quick freeze unit and the cartons, not being transparent, the customer must read the label to ascertain the contents. Because the food product, when placed in the bag, did not go all the way to the top, the unit when frozen is not a complete rectangular solid. Also it frequently has a combination of ice and air around portions of it in quite undesirable places. If the package was frozen standing on one end it has an irregular top, if it was frozen lying on one large side, it has an irregular opposite side. The irregular top is very unattractive to the eye, whether it be at the end or on one of the large sides.

Among the objects of this invention is to make a product which will be uniform on opposite packing sides or bearing sides so that successive units can be packed one upon the other without sliding from each other and so that the bearing portions of the units will not have any combined air and frozen product upon their bearing portions. Another object of the invention is to do away with all approximation on the part of the packer of the product as to whether an inch or other adequate space has been left for the expansion of the product in freezing. In the instant invention the bag or otherwise prepared container is filled clear to the top so that no guesswork is involved. Another object of the invention is to provide an expanding portion of the bag or portion of the container which will be located away from the opposed bearing surfaces of adjacent units, actually the expanding portion of the bag or container portion may be located in any place desired except on the bearing surfaces. Another object of the invention is to produce a transparent unit of food so that an inspection would immediately show not only the type of food but the quality of the pack.

This application is a continuation in part of application Serial No. 156,521 filed April 18, 1950, Patent No. 2,633,006.

In that co-pending application the invention was primarily directed to obtaining regularity in the edges of the unit produced. In the instant invention the novelty is primarily directed to obtaining regularity in the opposed bearing surfaces which are preferably parallel to aid in even stacking of the units one upon the other and also to assure smooth large surfaces to the unit whether in the bag or in the form or container in which it was frozen. These smooth large surfaces are produced without any air bubbles so that the exact appearance of the product itself, as frozen, will be readily apparent.

These and other objects of the invention will be apparent from the following description and the accompanying drawing forming a part hereof and in which:

Figure 4 is an extended view of a modification of the freezing container or form.

Figure 5 is a further modification of the freezing form.

Figure 6 is a fragmentary sectional view on line 6—6 of Figure 4.

Figure 7 is a fragmentary sectional view on line 7—7 of Figure 5.

Figure 8 is a transverse sectional view of the form of Figure 4 folded up and containing a bag.

In the drawings similar numerals refer to similar parts throughout the several views.

Figure 1:
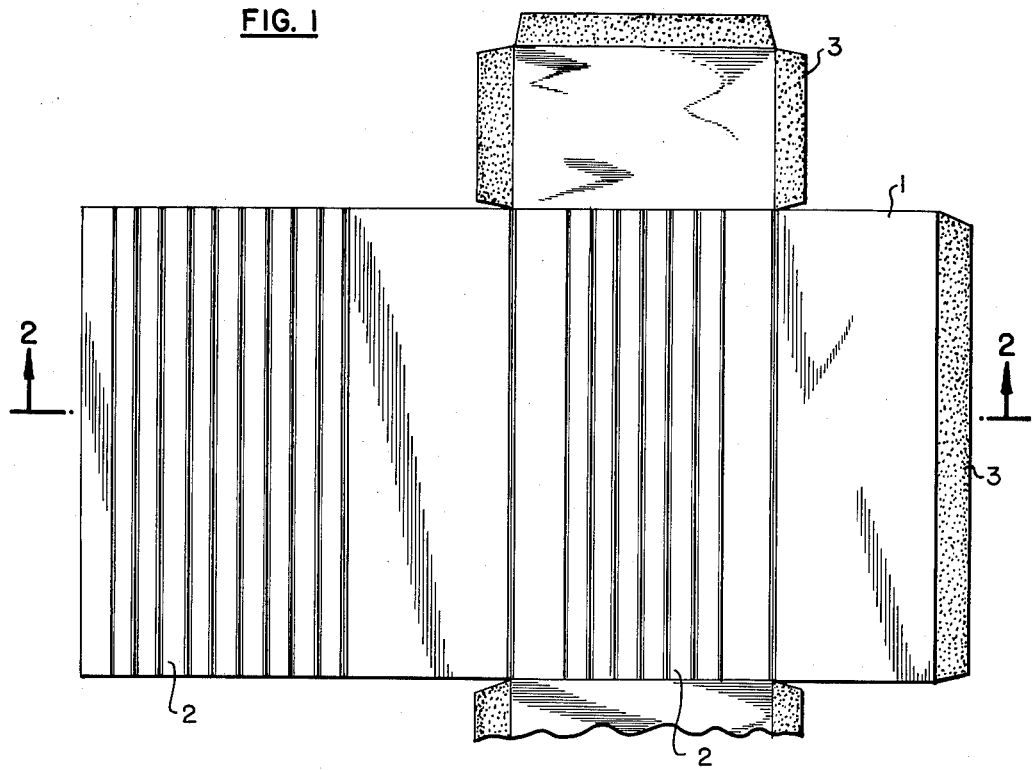
Figure 1 is an extended view of a packing container or form before folding.
Figure 2:
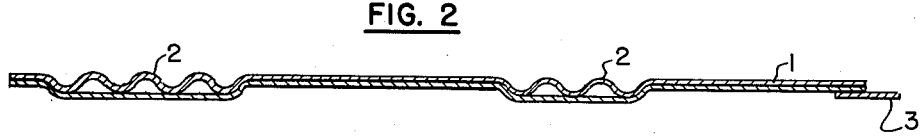
Figure 2 is a cross sectional view thereof on line 2—2 of Figure 1.
Figure 3:
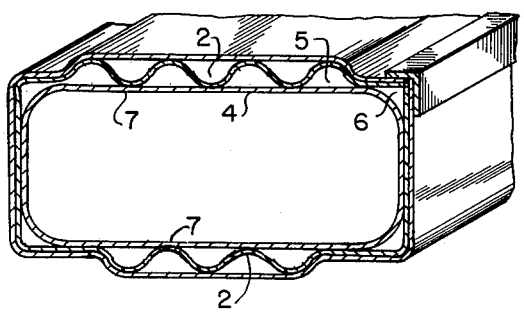
Figure 3 is a cross sectional view of the folded form containing a bag.

The container or form 1 of Figure 1 is preferably made of material sufficiently rigid to hold the material to be frozen in the shape of the form during freezing. It has corrugated parallel faces as shown at 2. The corrugations are opposite to one another, as shown in Figure 3 so that the unit after freezing, with corrugations in its opposite faces, will interlock with adjacent units placed one upon the other. The container has adhesive 3 at the edges of the flaps so that the container may be closed tightly after filling.

In this modification it is preferred that the material be placed in a bag 4 which is preferably made of polyethylene which is stretchable under pressure but which retains its shape unstretched when the fluid material is first placed in the bag and when the bag is sealed, preferably at the end. In placing the fluid material in the bag, the bag is sealed at the top, after being filled to exclude all air. The filled bag in the position shown in Figure 3 is sufficiently rigid so that its faces will not enter the corrugations of the container or form. As a consequence of this semi-rigidity of the bag, the fluid material will be adjacent the projecting ridges of the corrugations of the form and consequently these portions of the unit will be uniform in shape and not expand upon freezing. The expansion upon freezing will take place between the elevations of the corrugations as at 5 or between the edges of the form and the curved edges of the bag as at 6. As a result of this controlled freezing the unit frozen will have bearing portions at at 7 which will be uniform and spaced from one another so that adjacent units can be packed one upon the other, keeping their edges always in line, because of the alternate spacing of the corrugations in the form. In this particular modification there may be some irregularity in the extending ridges as at 5 but these will not interfere with the uniform stacking of adjacent units.

In the modification shown in Figures 4 and 5 there is a form 8 with sealing flaps 9 and a rubber member 10 affixed to opposite faces. The bag 7 in this modification is also stretchable with the freezing of the unit, but it is likewise sufficiently rigid not to stretch with the fluid material until freezing begins so that interstices 11 at the corners are left when the bag is completely filled and sealed up in the freezing form. Also interstices are left at 12 between the edges of the rubber member 10 and the opposite parallel faces of the form as it is closed, illustrated in Figure 8. In this construction the large opposite areas 13 freeze first and uniformly to make parallel opposite bearing portions for the unit and successive units may be stacked up together. As the fluid is frozen to a solid or unit, the bag 7 expands in the spaces 11 and 12, perhaps not uniformly but the uniform bearing surfaces have been properly preserved. It will be apparent that the rubber 10 may itself be contracted if further expansion of the product is required in freezing.

Another modification of this same form is illustrated in Figures 5 and 7 in which the opposite parallel faces of the form are rectangularly indented at 14 as illustrated. This will likewise leave interstices adjacent the indentations as well as along the edges of the form between the form and the bag and the expansion will take place in these interstices.

Figure 9:
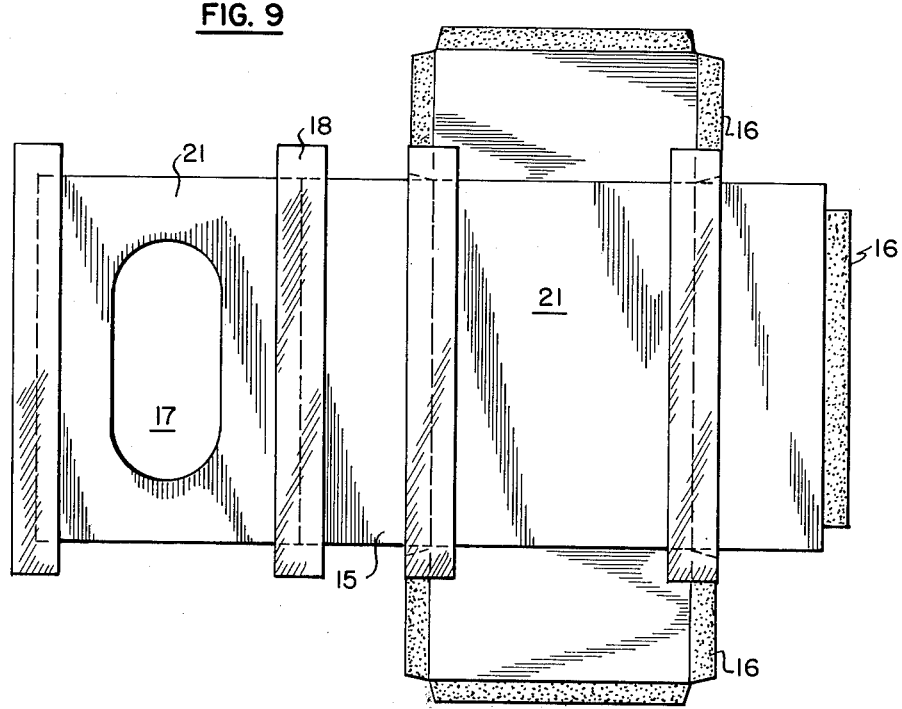
Figure 9 is an extended view of a container or form which can be used without a bag.
Figure 10:
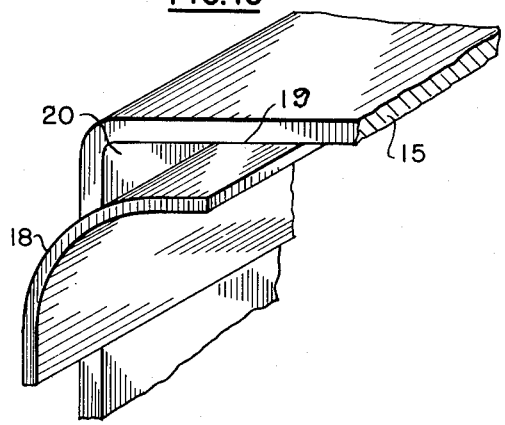
Figure 10 is a perspective view of the edge of the form of Figure 9 with an expanding member in place.
Figure 11:
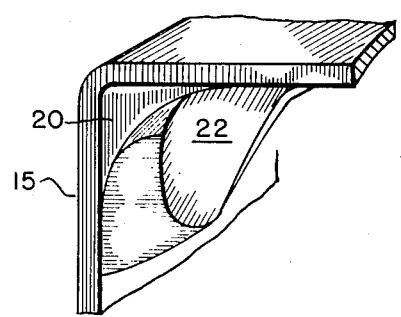
Figure 11 is a perspective view of the corner of the form of Figure 10 with the member folded over ready for closing.

It is not always essential to place the fluid product in a bag. The form itself may have stretchable material cemented to it along its edges which will allow for adequate expansion of the fluid product upon freezing. This is illustrated in Figures 9 and 10 in which the form 15 again has sealing flaps 16 and has its inner surface made impervious to fluid with any desired medium. Window 17 may also be placed in this form. Strips 18 of stretchable material are cemented to the inner surface edges of the form as illustrated at 19 in Figure 10. This leaves spaces or interstices 20 at the edges of the form so that upon freezing of the contained fluid material the stretchable members 18 may expand into the interstices 20 and the product itself will retain the parallelism of its opposite large faces in contact with the faces 21 of the form. In the placing of these stretchable members 18 in the form it is required that they be folded over as illustrated at 22 in Figure 11 and cemented to the adjacent end flaps of the form when it is sealed. This is essential to keep the fluid material from running around the ends of the members 18 and filling up the interstices 20. In this modification the members 18 are sufficiently rigid to retain the unfrozen material when the carton or form is filled to leave the interstices 20 open, but the members expand or stretch upon freezing and enter the interstices 20 to accommodate the greater volume of the unit produced by freezing.

Figure 12:
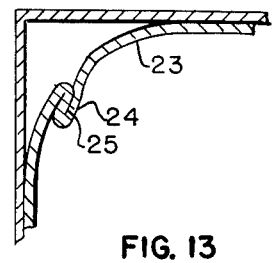
Figure 12 is a sectional view of a modification of the expanding member of Figure 10.
Figure 13:
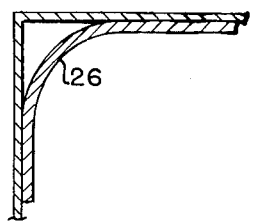
Figure 13 is a sectional view of the modification of Figure 12 after freezing.
Figure 14:
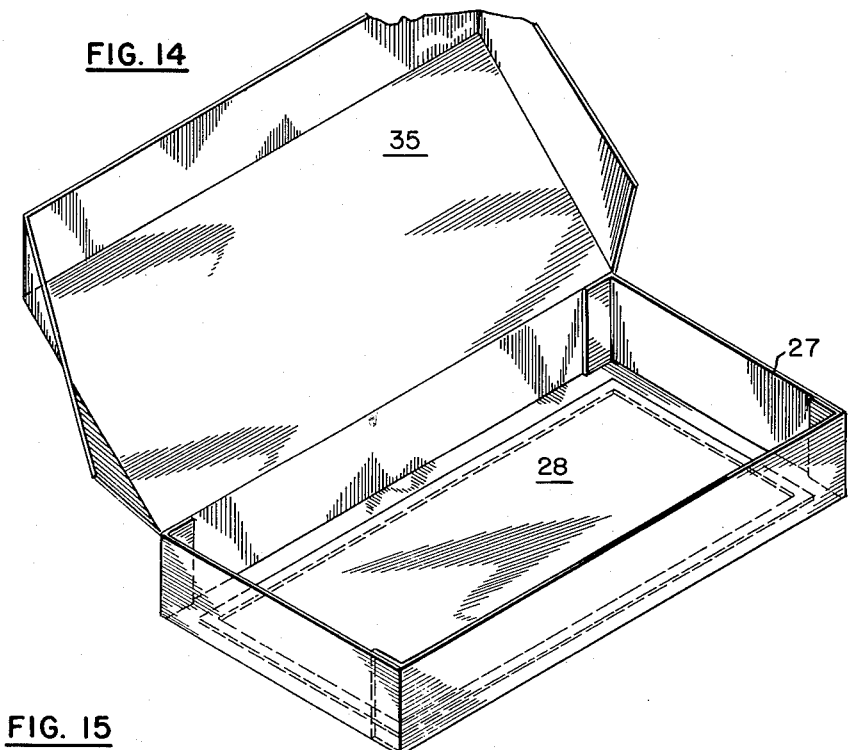
Figure 14 is a perspective view of a transparent face container or form.
Figure 15:
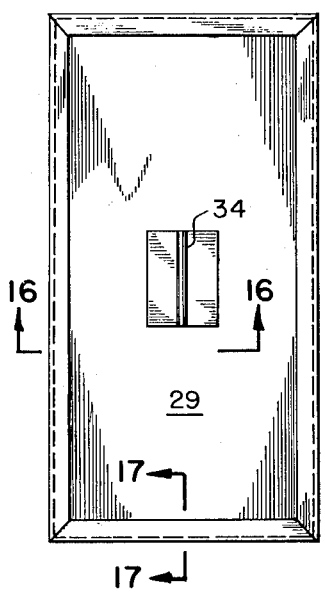
Figure 15 is a top plan view of the mechanism to control the freezing material placed in the container of Figure 14.
Figure 16:
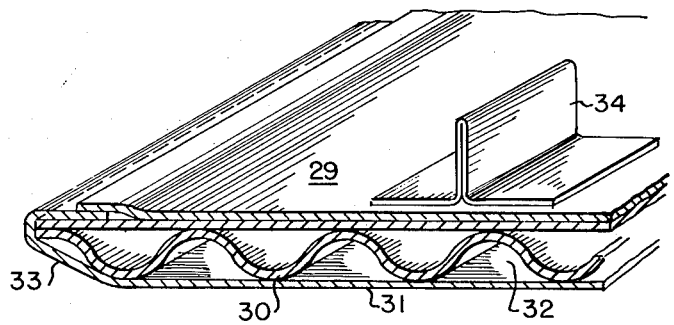
Figure 16 is sectional perspective view on line 16—16 of Figure 15.
Figure 18:
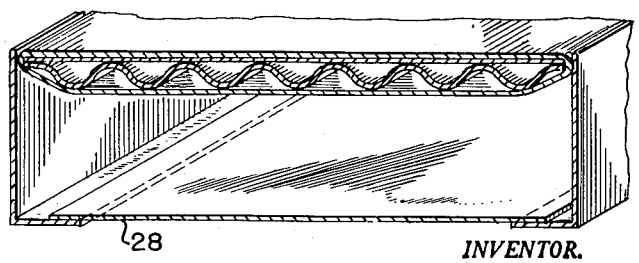
Figure 18 is a sectional view of the container of Figure 14 closed with the freezing control member in place.
Figure 17:
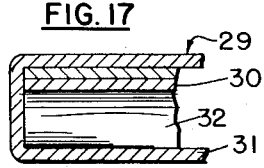
Figure 17 is a sectional view on line 17—17 of Figure 15.

Instead of using stretchable material either for the bag or for the cemented edge strips 18, fluted edged bags or longitudinally fluted strips may be used. Such strips are illustrated in Figure 12 at 23 and the flutes are shown at 24. These flutes will be sufficiently rigid to retain their shape as flutes when the container or bag is filled with unfrozen fluid and yet be allowed to expand when this fluid is frozen, and their edges 25 may have releasable adhesive placed between them to hold them in their fluted position until the freezing of the fluid material begins. It is desired that the flutes be substantially the size required for the expansion of the given material being frozen, so that when the flutes expand upon freezing of the material they will present a rounded surface as at 26 in Figure 13. This is also preferred so that the projecting edges of the flutes will not be bound or frozen into the product.

In Figures 14 to 18 inclusive a further modification is shown of a container 27, the inside of which is impervious to the fluid being frozen and a window 28 is shown at the bottom of the container, likewise impervious to the fluid. This container is preferably sufficiently rigid to retain the material placed in it rectangular upon freezing. To allow room for the expansion of the material upon freezing an expansion pad or member 29 is provided. This pad is made up of single corrugated board having projecting corrugations 30 and the pad is covered with an expansible plastic at 31 which will expand into the spaces 32 provided by the corrugations upon freezing the material. The expansion pad is preferably provided with sloping edges 33 so that when the pad is placed on the top of the material in the form, the fluid material will rise at the edges 33 and the expansible material 31 will be in close contact with the fluid material. The pad is light because of the air entrapped between the corrugations and floats on the fluid material and excludes air from the upper face of the fluid material. It is preferred that the container or form be filled to the top, but without waste when the expansion pad is in place. The handle 34 on the pad is folded down flush with the surface of the pad before closing the top 35 of the form.

Before the fluid freezes in this container it is in contact with the transparent bottom and with the projecting flutes 30 of the corrugated form of the pad and these opposite bearing surfaces will always be uniform. Upon freezing the fluid will expand into the corrugations 32, stretching the material 31. These upwardly projecting corrugations may lack uniformity, but the bearing surface of the folding top of the container, bearing upon the flutes in the product, through the corrugated board, always presents a smooth surface, as does the window side of the container. So these units may likewise be stacked uniformly.

It will be apparent that in the use of this particular form, that at the bottom of the form all air will of necessity be excluded, although a similar effort is made in every other case also. When this form is inverted so that the bottom becomes the top, a clear frozen unit readily viewable through the transparent bottom, now top, will appear.

Several modifications of this invention have been illustrated, the advantage of the modifications being that units may be stacked upon one another with uniform opposite bearing faces and that air is excluded from the product as it is initially placed in the tight bag or the expanding edged container or form.

What is claimed as new and is desired to be secured by Letters Patent is:

1. Apparatus for the controlled freezing of food and liquid product units of substantially the same size and shape so that the units will stack together evenly characterized by the units having a generally rectangular shape with opposite stacking surfaces of each unit corresponding with those of the other units, comprising a tightly closed and readily openable form adaptable for complete immersion within a freezing medium and having closed walls excluding the freezing medium from the form, the walls joining each other angularly and providing an inner uniform unit shaping space for the receipt of unfrozen material to the surfaces that shape the opposite stacking surfaces of the unfrozen material into a unit upon freezing to conduct heat from bearing portions of the opposed stacking surfaces uniformly, and means within the form sufficiently rigid to restrain the unfrozen material to a smaller outer contour than that provided by the form, the material throughout conforming to the contour of the walled form and the restraining means, said form, at the locations of the material restraining means therein, insulating the unfrozen material from the form to promote a slower rate of heat conductivity than at the unit shaping bearing portions of the stacking surfaces, the material restraining means being expansible, to localize the expansion of the material upon freezing adjacent the restraining means and toward the adjacent form surfaces.

2. Apparatus for the controlled freezing of food and liquid product units of substantially the same size and shape so that the units will stack together evenly characterized by the units having a generally rectangular shape with opposite stacking surfaces of each unit corresponding with those of the other units, comprising a tightly closed and readily openable form adaptable for complete immersion within a freezing medium and having closed walls excluding the freezing medium from the form, the walls joining each other angularly, two opposite walls being substantially parallel and closer together than others, providing an inner uniform unit shaping space for the receipt of unfrozen material to said two opposite walls that shape opposite stacking surfaces of the unfrozen material into a unit upon freezing to conduct heat from bearing portions of the opposed stacking surfaces uniformly and expansible means within the form to restrain the unfrozen material to a smaller outer contour than that provided by the form to localize expansion of the material upon freezing adjacent the restraining means, said means being sufficiently rigid to restrain the unfrozen material when the whole of said means has unfrozen material adjacent its restraining surfaces, the material throughout conforming to the contour of the walled form and the restraining means, said form, at the locations of the material restraining means therein insulating the unfrozen material from the form to promote a slower rate of heat conductivity than at the bearing portions of the stacking surfaces, the expansible material restraining means expanding toward the adjacent form surfaces upon freezing the contained material.

3. Apparatus for the controlled freezing of food and liquid product units of substantially the same size and shape so that the units will stack together evenly characterized by the units having a generally rectangular shape with opposite stacking surfaces of each unit corresponding with those of the other units, comprising a tightly closed and readily openable form adaptable for complete immersion within a freezing medium and having closed walls excluding the freezing medium from the form, the walls joining each other angularly and providing an inner uniform unit shaping space for the receipt of unfrozen material to the surfaces that shape the opposite stacking surfaces of the unfrozen material into a unit upon freezing to conduct heat from bearing portions of the opposed stacking surfaces uniformly, and an expansible bag within the form for the receipt of the unfrozen material thereinto, the material throughout conforming to the contour of the bag, the bag having a smaller outer contour than that of the interior of the form, the completely filled bag so nearly filling the interior of the form that the form forces the completely filled bag next to the bearing portions of the opposed stacking surfaces of the form, said bag, at various portions other than said bearing portions, being spaced from the form, the spacing insulating the unfrozen material from the form to promote a slower rate of heat conductivity than at the unit shaping bearing portions of the stacking surfaces to localize the expansion of the material upon freezing at the spaced portions of the bag from the form, the expansible bag, where spaced from the form, expanding toward the adjacent form surfaces upon freezing the contained material.

4. Apparatus for the controlled freezing of food and liquid product units of substantially the same size and shape so that the units will stack together evenly characterized by the units having a generally rectangular shape with opposite stacking surfaces of each unit corresponding with those of the other units, comprising a tightly closed and readily openable form adaptable for complete immersion within a freezing medium and having closed walls excluding the freezing medium from the form, the walls joining each other angularly and providing an inner uniform unit shaping space for the receipt of unfrozen material to the surfaces that shape the opposite stacking surfaces of the unfrozen material into a unit upon freezing to conduct heat from bearing portions of the opposed stacking surfaces uniformly, and an expansible bag within the form for the receipt of the unfrozen material thereinto, the material throughout conforming to the contour of the bag, the bag having a smaller outer contour than that of the interior of the form, and means within the form to force the completely filled bag next to the bearing portions of the opposed stacking surfaces of the form, said bag, at various portions other than said bearing portions, being spaced from the form, the spacing insulating the unfrozen material from the form to promote a slower rate of heat conductivity than at the unit shaping bearing portions of the stacking surfaces to localize the expansion of the material upon freezing at the spaced portions of the bag from the form, the expansible bag, where spaced from the form, expanding toward the adjacent form surfaces upon freezing the contained material.

5. Apparatus for the controlled freezing of food and liquid product units of substantially the same size and shape so that the units will stack together evenly characterized by the units having a generally rectangular shape with opposite stacking surfaces of each unit corresponding with those of the other units, comprising a tightly closed and readily openable form adaptable for complete immersion within a freezing medium and having closed walls excluding the freezing medium from the form, the walls joining each other angularly, two opposite walls being substantially parallel and closer together than others, providing an inner uniform unit shaping space for the receipt of unfrozen material to said two opposite walls that shape opposite stacking surfaces of the unfrozen material into a unit upon freezing to conduct heat from bearing portions of the opposed stacking surfaces uniformly and an expansible bag within the form for the receipt of the unfrozen material thereinto, the material throughout conforming to the contour of the bag, the bag having a smaller outer contour than that of the interior of the form, and means within the form to force the completely filled bag next to the bearing portions of the opposed stacking surfaces of the form, said bag being sufficiently rigid to restrain the unfrozen material when the whole of said bag is filled, said bag, at various portions other than said bearing portions, being spaced from the form, the spacing insulating the unfrozen material from the form to promote a slower rate of heat conductivity than at the unit shaping bearing portions of the stacking surfaces to localize the expansion of the material upon freezing at the spaced portions of the bag from the form, the expansible bag, where spaced from the form, expanding toward the adjacent form surfaces upon freezing the contained material.

References Cited in the file of this patent

UNITED STATES PATENTS

| | | |
|---|---|---|
| 1,422,126 | Petersen | July 11, 1922 |
| 1,824,359 | Miller | Sept. 22, 1931 |
| 2,011,244 | Hannaford | Aug. 13, 1935 |
| 2,109,102 | Cocks | Feb. 22, 1938 |
| 2,260,450 | Guinane | Oct. 28, 1941 |
| 2,633,006 | Taylor | Mar. 31, 1953 |